(12) United States Patent
Hettenkofer et al.

(10) Patent No.: US 12,043,374 B2
(45) Date of Patent: Jul. 23, 2024

(54) HYBRID PROPULSION SYSTEM OF A HELICOPTER

(71) Applicant: KOPTER GROUP AG, Mollis (CH)

(72) Inventors: Johann Werner Hettenkofer, Ottobrunn (DE); Detlev Matthias Even, Kailua, HI (US); Andreas Wilfried Dummel, Hohenbrunn (DE)

(73) Assignee: KOPTER GROUP AG, Mollis (CH)

( * ) Notice: Subject to any disclaimer, the term of this patent is extended or adjusted under 35 U.S.C. 154(b) by 103 days.

(21) Appl. No.: 17/796,238

(22) PCT Filed: Jan. 26, 2021

(86) PCT No.: PCT/EP2021/051720
§ 371 (c)(1),
(2) Date: Jul. 28, 2022

(87) PCT Pub. No.: WO2021/151873
PCT Pub. Date: Aug. 5, 2021

(65) Prior Publication Data
US 2023/0078649 A1 Mar. 16, 2023

(30) Foreign Application Priority Data

Jan. 29, 2020 (CH) ........................................ 103/20

(51) Int. Cl.
*B64C 27/12* (2006.01)
*B64D 27/10* (2006.01)
(Continued)

(52) U.S. Cl.
CPC .............. *B64C 27/12* (2013.01); *B64D 27/10* (2013.01); *B64D 27/24* (2013.01); *B64D 31/00* (2013.01); *H02K 7/14* (2013.01); *B64D 27/026* (2024.01)

(58) Field of Classification Search
CPC ........ B64D 27/10; B64D 27/12; B64D 27/24; B64D 2027/026; B64D 31/00; H02K 7/14
See application file for complete search history.

(56) References Cited

U.S. PATENT DOCUMENTS

2013/0147204 A1* 6/2013 Botti ........................ F02B 63/04
                                                903/903
2017/0225573 A1* 8/2017 Waltner .................. B60L 50/16
(Continued)

FOREIGN PATENT DOCUMENTS

CN        108082499 A     5/2018
DE    102010021026 A1    11/2011
(Continued)

OTHER PUBLICATIONS

International Search Report (With English Translation) and Written Opinion mailed on Apr. 22, 2021, in corresponding International Application No. PCT/EP2021/051720; 13 pages.
(Continued)

*Primary Examiner* — Tye William Abell
(74) *Attorney, Agent, or Firm* — Maier & Maier, PLLC

(57) ABSTRACT

A hybrid propulsion system with controllers and a drive shaft of a helicopter with a main rotor connected to a gearbox which can keep a flight attitude set by a pilot stable. It includes a pilot controller, a combustion engine and an electric motor, both of which act directly on the drive shaft. The VM is connected to a VM controller, and the EM is connected to an EM controller. One torque sensor and one tachometer are each arranged on the drive shaft, wherein during operation both the VM controller and the EM controller are able to receive values for the current speed and the current torque. Specified values for speed and torque, in which the VM can attain its optimum efficiency, are stored in memory and can be retrieved by the EM controller, wherein the first value can also be retrieved by the VM controller.

12 Claims, 1 Drawing Sheet

(51) Int. Cl.
  *B64D 27/24*    (2006.01)
  *B64D 31/00*    (2006.01)
  *H02K 7/14*     (2006.01)
  *B64D 27/02*    (2006.01)

(56)                References Cited

U.S. PATENT DOCUMENTS

2018/0354635 A1*  12/2018  Wagner .................. B64D 27/24
2019/0322382 A1*  10/2019  Mackin .................. B64D 27/10
2021/0237887 A1*   8/2021  Besse ..................... B64C 27/06

FOREIGN PATENT DOCUMENTS

EP        3162713 A1    5/2017
WO     2014182616 A2   11/2014
WO     2019211549 A1   11/2019

OTHER PUBLICATIONS

Office Action issued on Jul. 28, 2023, in corresponding Japanese Application No. 2022-546026, 5 pages.

* cited by examiner

HYBRID PROPULSION SYSTEM OF A HELICOPTER

FIELD

The invention relates to a hybrid propulsion system with controllers and a drive shaft of a helicopter with a main rotor connected to a gearbox which can keep a flight attitude set by a pilot stable, comprising a pilot controller, a combustion engine (VM) and an electric motor (EM), both of which act directly on the drive shaft (3). The VM is connected to a VM controller which is able to regulate the delivery of fuel from a fuel tank to the VM in order to provide the desired propulsive power at the drive shaft, and the EM is connected to an EM controller, which can drive the EM by discharging a battery or charge the battery by the application of mechanical power to the EM, whereby the drive shaft is either accelerated or decelerated respectively. The invention relates further to a method for operating such a hybrid propulsion system.

BACKGROUND

As in the automotive industry, propulsion with an additional electric motor, in particular with hybrid drive, is also known for helicopters.

A similar system to the one described above is known from US 2017/0225573 A1. It comprises an internal combustion engine and an electric motor which is arranged between the internal combustion engine and the gearbox of the main rotor. The same is true in US 2018/0354635 A1. This document also describes a method which uses various computer systems to regulate the distribution between the combustion engine and the electric motor.

A further hybrid system is known from EP 3162713, which operates a helicopter by means of an electric and a combustion engine. The aim of the regulation described in this document is to absorb power peaks with the electric motor so that the combustion engine is operated in "steady state" mode to the extent possible, also known as "moving average power". To achieve this, the control signal used is split into a high-frequency partial signal and a low-frequency partial signal, wherein the faster, high-frequency signal is transmitted to the electric motor and the slower, low-frequency signal is sent to the combustion engine. Rapid changes are thus managed by the electric motor, while the combustion engine only has to deal with power fluctuations at a slower, "damped" rate, as it were. The casualty of this distribution is safety in the event that one of the engines fails. Since neither of the engines receives the entire signal, the engine that is still operating cannot handle the flight requirements in and of itself. An additional monitoring system must detect the failure of the engine and immediately initiate measures to ensure that the remaining engine receives the entire signal. Any required additional control or monitoring system itself represents a risk to flight safety.

SUMMARY

It is the object of the present invention to describe a hybrid propulsion system with which the safest possible operation of the helicopter can be guaranteed. It is a further object of the invention to present a method according to which safe operation can be carried out. Such safe operation must also be carried out with minimal fuel consumption.

According to the invention, in a hybrid propulsion system as described in the introduction at least one torque sensor and one tachometer are each arranged on the drive shaft, wherein both the VM controller as well as the EM controller can each receive values for the current speed DZ and the current torque DM during operation.

Specified values for the speed $DZ_0$ and the torque $DM_0$, at which the VM reaches optimum efficiency, are also stored. These values can be retrieved by the EM controller, wherein the first of said values, $DZ_0$, can be retrieved for the VM controller as well.

The VM controller is capable of reaching the preset speed $DZ_0$ at the drive shaft and keeping it constant autarchically at any time by adjustment of the power from the VM, which in turn also keeps any flight attitude set by the pilot controller stable. The EM controller is also able to further accelerate or decelerate the drive shaft by engagement of the EM, which causes the speed DZ to change, and the VM controller automatically adjusts the output at the VM in order to reach the preset speed $DZ_0$ at the drive shaft again and maintain it.

A first directive is stored in the EM controller, according to which the EM must constantly apply an accelerating or decelerating force of such kind to the drive shaft, so that the VM, when it reaches or maintains the optimum speed $DZ_0$ at the drive shaft, automatically generates the torque $DM_0$ at the drive shaft with which it reaches the optimum engine output.

The EM is preferably arranged between the VM and the gearbox of the main rotor 1. The speed DZ can be measured at any point on the drive shaft, it is the same at all points. At least one of the torque sensors should be arranged between the VM and the EM, in order to determine the load of the VM on the drive shaft. Further torque sensors may be arranged between the EM and the gearbox to determine the total load on the drive shaft. However, the most important element for adjusting the EM controller is the torque sensor between VM and EM, since this indicates the output at the VM which is to be operated with maximum efficiency according to the first directive.

A direct data signal line used during take-off and landing of the helicopter may be set up between the pilot controller and der VM controller. In these phases, the first directive does not have to be applied. The indirect connection exists permanently via the flight attitude of the helicopter: If the pilot trims the pitch of the rotor blades more steeply to gain altitude, the higher load immediately causes the speed DZ at the drive shaft to fall, on the basis of which the demand for power in normal operation is adapted according to the first directive.

Additionally, a fuel level meter may be arranged on the fuel tank and a charge state indicator may be arranged on the battery, and each may transmit its measurement data while the EM controller is operating. The energies still available in each case may be calculated by a calculation unit. If needed, the EM controller may behave according to a second directive, which differs from the first directive. The purpose of this may be to protect the battery from overcharging or undercharging, to save fuel and/or temporarily operate the VM at lower power in order to reduce emissions.

The important objective is that the VM controller with the VM is able to reach the required speed DZ at the drive shaft autarchically at any time, in order to reach or maintain a stable flight attitude set by the pilot controller. This means that a helicopter with its VM can be equipped with an EM and an EM controller in such a way without the need to intervene in the existing VM control system. The consequence of this is that in the event of a system error, if the EM and/or the EM controller fail, the helicopter can be flown normally using just the VM.

The method according to the invention for operating a hybrid propulsion system for a drive shaft of a helicopter guarantees a flight attitude set by the pilot using a hybrid propulsion system with controls according to the invention. It performs the following steps:

The current values for speed DZ and torque DM are measured continuously at the drive shaft, and transmitted to both the EM controller and the VM controller. Preset values for speed $DZ_0$ and torque $DM_0$ are stored in memory, wherein both values $DZ_0$, $DM_0$ can be retrieved by the EM controller and at least the speed $DZ_0$ can be retrieved by the VM controller. Both controllers continuously calculate deviations of the measured values DZ, DM from the preset values $DZ_0$, $DM_0$, which are known to them.

As soon as a pilot generates a changed demand for output at the drive shaft via the pilot controller to reach a desired flight attitude, a change in the speed DZ at drive shaft is effected. The VM controller changes the output at the VM less quickly on the basis of a deviation of the current speed DZ from the preset speed $DZ_0$ in such manner that the preset speed $DZ_0$ is regained.

This is explained in greater detail in the following example: The VM controller is adjusted such that the VM constantly applies the load for reaching and maintaining the optimal speed $DZ_0$ If the pilot trims the rotor blades to gain altitude, as a consequence of this the speed DZ falls. The VM responds to this fall in speed DZ with increased output, the torque DM generated by the VM increases. This in turn has the effect of increasing the speed DZ. As soon as the speed has reached the preset value $DZ_0$ again and said speed remains constant, the VM controller no longer has cause to change the engine output. The VM continues working unchanged, but now with greater torque DM than before the rotor blades were trimmed. When the helicopter descends, the correspondingly inverse action takes place, the torque DM applied by the VM deceases.

But in the method according to the invention with the hybrid propulsion system, the EM controller engages according to its first directive. On the basis of a deviation of the current values for speed DZ and/or torque DM from the corresponding specified values $DZ_0$, $DM_0$, it changes the output at the EM faster than the VM, to such effect that, when it has adjusted its output to the preset speed $DZ_0$, the VM applies the preset torque $DM_0$, at which it reaches optimal efficiency. The EM controller achieves this either by charging the battery using the mechanical power at the EM or operating the EM using the charge in the battery.

In the example described above, therefore, the EM controller then engages. The preset values for speed $DZ_0$ and torque $DM_0$ are known to it, it is able to calculate the respective differences from the current values DZ, DM on the basis of the measurement values it receives.

The EM controller initially works according to its first directive. Accordingly, if the pilot trims the rotor blades to gain altitude, the speed falls at first, as described previously. But before the VM increases its output by generating more torque, the EM responding considerably more quickly generates the additional load requirement, so that the required speed $DZ_0$ is regained immediately. The VM controller, which also monitors the speed continuously, detects nothing more than a brief, minor deviation from the preset speed $DZ_0$, which has been compensated immediately by the EM, because the EM immediately supplied the necessary load therefor. Due to its slower response time, the VM does not increase its output, it maintains the torque DM it generated originally unchanged.

The same also happens during a descent, when the pilot flattens the pitch of the rotor blades. The battery of the EM is charged as the EM decelerates the drive shaft before the VM compensates for the increase in speed and can reduce the power it applies.

On the one hand, this first directive of the EM controller thus adjusts the speed $DZ_0$ at the drive shaft, and keeps it constant by actuating the EM correspondingly. This in turn prevents the load on the VM from changing, its torque remains constant. This is desirable while said torque is equal to the preset torque $DM_0$ While this is the case, efficiency remains optimal.

On the other hand, the EM controller also continuously checks whether the torque DM currently generated at the drive shaft by the VM corresponds to the preset torque $DM_0$. Deviations may occur for example after take-off, when climbing or descending, or after the EM has been deactivated, for instance because the charge stat of the battery was too low. When a deviation in torque is detected, the first directive of the EM controller therefore also adjusts this measured torque DM to the preset value $DM_0$, as follows: If the measured torque is too high, the EM controller adjusts the DZ to a constantly slightly higher value. The VM controller responds to this by reducing output, which results in the torque generated by the VM decreasing steadily. The EM controller maintains the slightly increased speed until the measured torque DM matches the preset torque $DM_0$. As soon as this has been reached, the output at the EM is rapidly reduced again until the preset speed $DZ_0$ is regained. As a consequence of this, the preset torque $DM_0$ is also maintained. The VM now works at optimum efficiency, the EM controller keeps the DZ constant again so that the VM delivers its optimal output unchanged.

Accordingly, the EM controller increases the output at the EM in operation in response to the speed being too low, if $DZ<DZ_0$, and/or in response to excess torque, if $DM>DM_0$, and vice versa.

According to the invention, if the EM controller is deactivated the VM controller automatically guarantees a stable flight attitude by adjusting speed to the preset value $DZ_0$, as the requisite propulsive power is provided via VM. No adaptation and no further monitoring are required for this.

In a preferred method, using the measurement data from a fuel level meter of the fuel tanks and/or a charge state indicator of the battery, the EM controller can calculate the energies that are still available and on that basis deviate temporarily from the first directive and behave according to a second directive. In this second directive, the battery can be charged or discharged selectively in order to protect the battery, save fuel, or temporarily operate the VM at lower power to reduce emissions.

This serves to prevent deep discharging or overcharging of the battery, for example. On the other hand, the EM may be used selectively more often at higher altitudes, because fuel consumption increases relatively sharply there. Additionally, the EM may be operated exclusively during the take-off and/or landing phases in order to reduce noise and exhaust emissions over land, or the VM may be used exclusively as required.

Whereas in EP 3162713 the pilot's signal is split into a high-frequency and a low-frequency control signal to achieve a desired distribution of output between two engines, with the present invention the division of outputs in normal operation is adjusted on the basis of a first directive of the EM by adjusting the measured speed DZ and the measured torque DM to the stored setpoints $DZ_0$ and $DM_0$. In the normal flight phase, apart from take-off and landing, the controllers of both engines do not receive control signals from the pilot. The EM and VM adjust their outputs so that the preset speed $DZ_0$ remains constant, wherein the EM responds more quickly to compensate for any deviation first, before the slow VM can respond to it. The EM also adjusts the torque DM delivered by the VM to the preset value $DM_0$ according to the first directive additional positive or negative power output. The hybrid propulsion system described here is thus easy to control and guarantees process reliability even if the VM fails unexpectedly.

In this way, the hybrid propulsion system is always flown with the load distribution that makes most efficient use of the available fuel. However, this is not achieved by carrying out complicated calculations but directly and simply based on the determination of the current values for speed DZ and torque DM in each case and knowledge of the preset values $DZ_0$, $DM_0$.

If the EM fails, the hybrid propulsion system according to the invention becomes a conventional VM propulsion system, as the VM controller supplies exactly the respective torque required at the drive shaft via the VM with a defined time lag that is necessary to reach and maintain the flight attitude set by the pilot in each case.

If the VM fails, the speed decreases, which is compensated immediately by the EM with additional output. By keeping the speed DZ constant, flight safety is guaranteed. The EM controller also determines that the torque DM delivered by the VM is absent, which only mean that the VM is out of operation. Accordingly, the EM takes over the task of generating total power until the VM begins operating again, or until the helicopter lands. Safe flight is guaranteed at all times.

Since the two controllers each receive the same information, which is generated directly from the flight attitude, either of the engines can assure the required flight attitude autonomously. Distribution of loads to the two engines takes place completely automatically as the EM detects and carries out its share of the work very quickly, allowing the VM to work continuously in the optimum range.

Additionally, when fuel is low the EM controller can increase the load on the EM to economise on fuel. A deviation from the first directive may also take place in order to prevent deep discharge or overcharging of the battery. The EM can also be engaged in the capacity of booster to deliver additional output, when overflying a high mountain, for example. On the other hand, if the battery charge allows it, increased use may be made of the EM in conditions of high temperature and/or at extreme altitudes, at which the power of the VM is significantly reduced because of the thin air, in order to raise the limit of available power or to save fuel. The EM may also be operated alone during the take-off and/or landing phase to reduce noise and exhaust emissions in the take-off and/or landing area.

The first directive is re-activated as soon as an exceptional situation no longer exists.

BRIEF DESCRIPTION OF THE DRAWINGS

In the following text, the invention will be described in greater detail with reference to the drawing. In the drawing.

DETAILED DESCRIPTION

Figure 1:
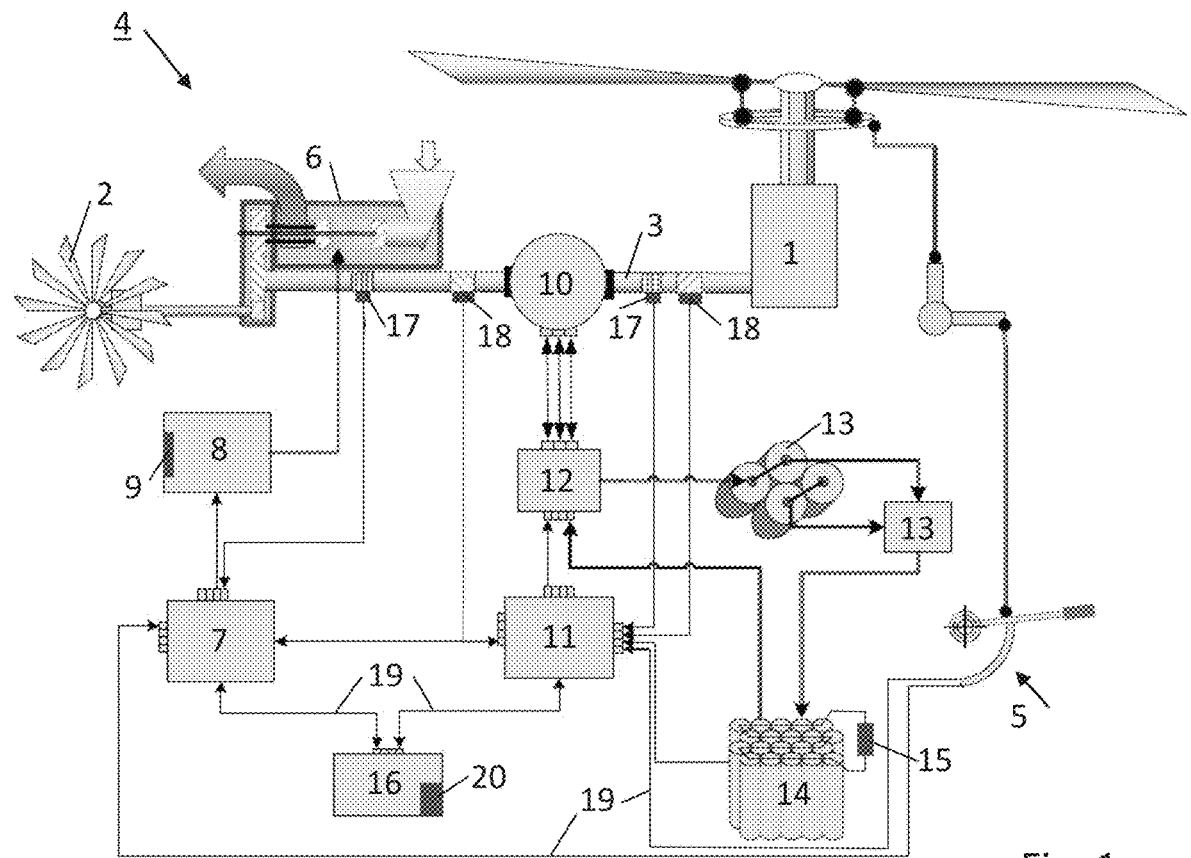
FIG. 1 is a schematic representation of a hybrid propulsion system according to the invention.

FIG. 1 represents a hybrid propulsion system 4 according to the invention in greater detail than is necessary for a simple description of the invention. It shows a partial area of a helicopter with a drivetrain 3, a gearbox with main rotor 1, as well as a tail rotor 2, which is not significant for the object of the invention. A combustion engine (VM) 6 and an electric motor (EM) 10 are arranged in parallel on the drivetrain 3, wherein the EM 10 is preferably arranged between the VM 6 and the gearbox of the main rotor 1. Other configurations are also possible.

A pilot controller 5 is responsible for receiving the control commands of a pilot for trimming the main rotor blades, as a result of which the engine output to be set is calculated indirectly as the required speed $DZ_0$ at the drive shaft 3. A data signal line 19 from the pilot controller to the VM controller 7 which is optional for the flight mode according to the invention may be used for take-off and landing manoeuvres.

The VM 6 is connected to a fuel tank 8, which is connected to the VM controller 7, which can adjust the supply of fuel from the fuel tank 8 to the VM 6 to provide the required propulsive output at the drive shaft 3. The EM 10 is also connected to a battery 14, preferably via a power converter 12 and via a charging unit 13, which may be equipped with current peak buffering. The EM 10 may be operated by the charge in the battery 14, or the battery 14 may be charged by the mechanical power at the EM 10, with the result that the drive shaft 3 is either accelerated or decelerated in each case. An EM controller 11 is connected to the EM 10 at least indirectly, via a power converter 12 for example, and can adjust it to deliver a required accelerating or decelerating force at the drive shaft 3.

In addition, a fuel level meter 9 may be arranged on the fuel tank 8 and a charge state indicator 15 on the battery 14, both of which can transmit their measurement data during operation to a calculation unit 16.

At least one torque sensor 17 and one tachometer 18 each are arranged on the drive shaft 3. During operation, the VM controller 7 and the EM controller 11 each receive data from at least one torque sensor 17 and one tachometer 18.

The calculation unit 16 is connected to the EM controller 11 and to the VM controller 7. It is used to calculate the energies that are still available, the torque required at the drive shaft 3 and/or to manage the EM controller 11. It includes a data memory 20, in which the values of a preset speed $DZ_0$ and a preset torque $DM_0$ are stored, wherein based on these values an optimum power coupling of the VM 6 is achieved, the efficiency of the VM being greatest at these values.

Figure 2:
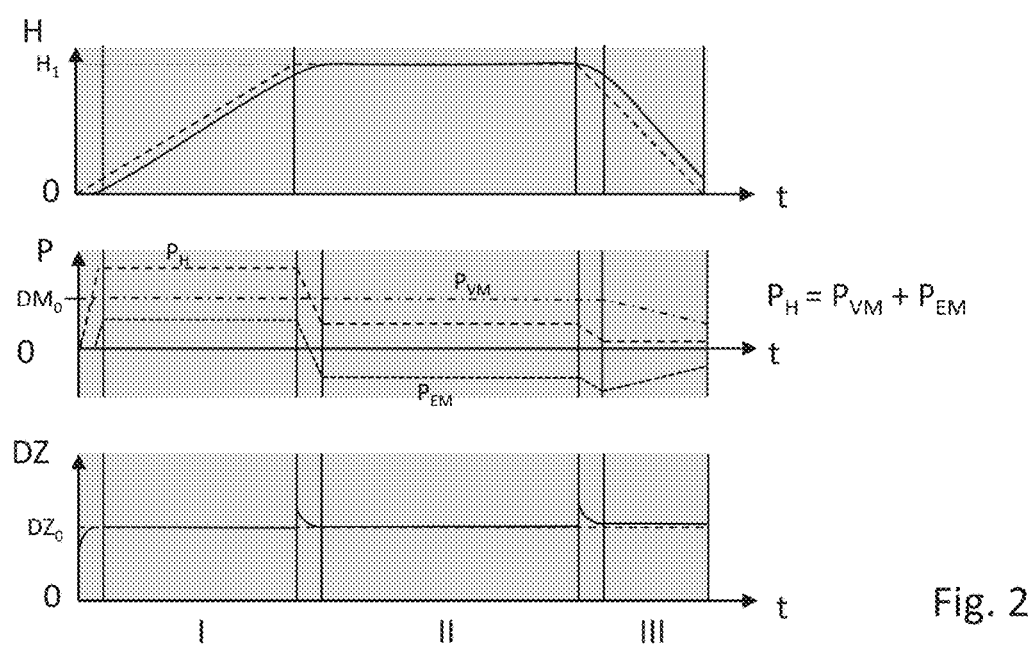
FIG. 2 is a graph describing the distribution of loads in various flight attitude, such as climbing, level flight and descent.

In operation, it is the EM controller 11 which initiates the distribution of loads to the VM 6 and the EM 10. This is represented schematically in FIG. 2.

The dashed plot in the top diagram represents the flight attitude as a function of time, as requested in each case by the pilot controller 5, in particular altitude H. In this context, altitude "0" is understood to be the ground. The solid line represents the effective altitude H, which is slightly delayed. In the first phase (I) the helicopter climbs steadily until it has reached the desired altitude $H_1$. In the second phase (II) it continues flying level at this altitude, and in the third phase (III) it descends again. There is a period between each flight phase before the newly specified target is reached.

The plots in the middle diagram schematically indicate the total load $P_H$, i.e. the total torque at the main rotor (dashed line), the load $P_{VM}$ at the VM 6 (dot-dashed line) and the load $P_{EM}$ at the EM 10 (dotted line). The bottom diagram indicates the speed DZ.

After the take-off procedure, the VM 6 works at a constant, high level. In the first phase I, the EM 10 serves as an additional drive by delivering the torque $DM_0$ as soon as the VM 6 has reached the preset optimal load $P_{VM}$. It supports the VM (6) during phase I while climbing until the preset altitude $H_1$ is reached, i.e. the pilot slightly flattens the angle of attack of the rotor blades. The take-off procedure can be performed according to instructions other than the first directive until the helicopter is safely airborne.

Flattening the rotor blades at the beginning of phase II causes the speed DZ to briefly increase slightly, as is shown in the bottom diagram. The EM 10 responds to this immediately, and lowers its output until the speed DZ matches the setpoint $DZ_0$ again. The altitude now remains constant throughout the entire phase II. The VM 6 is slow and therefore does not respond to this brief change. In the example shown, the load on the EM 10 in phase II is negative, so it functions as a generator, returning the extra available energy from the excess output from the VM 6 to the battery 14. The VM 6 also does not change its load in phase II.

When preparing to descend, at the beginning of phase III, the pilot slightly flattens the rotor blades again, the speed DZ again increases briefly, the EM 10 again responds to this by reducing its output. This time, however, it adjusts to a speed DZ slightly higher than the preset value $DZ_0$, according to a second directive. Now the energy at the EM 6 is recovered faster still, because the EM 10 continues to decelerate the drive shaft 3. Since the speed DZ is slightly elevated, the VM 6 now responds by reducing its output steadily. Meanwhile, the EM 10 maintains the elevated DZ, as is represented by the bottom plot in phase III: The solid line, representing the current speed DZ, is higher than the dashed line, which represents $DZ_0$. While the current speed DZ is greater than the setpoint speed $DZ_0$, the output at the VM 6 decreases, and the noise and exhaust emissions at the landing site are also reduced. This is achieved by the EM 10 steadily reducing its electrically generated power, accordingly it also reduces its decelerating effect.

According to the invention, the speed DZ of the drive shaft 3 is adjusted exclusively by the EM 10 in accordance with the first directive, such that it is maintained constant at $DM_0$ at the preset speed $DZ_0$ by the VM 6. According to the second directive, as shown in phase III the behaviour deviates from this in order to selectively reduce the load on the VM 6. Other reasons may result in the deviation from the first directive besides the reduction of emissions mentioned earlier. In particular, these are the deliberate charging and discharging of the battery 14 if its charge state requires such. The EM 10 may also be introduced as a booster to deliver increased power briefly, or to save fuel, at higher altitudes for example.

The second directive may be adjusted by noise regulations depending on overflight altitude and/or by prior definition of the planned flight path based on information about energy reserves, for example, if the EM controller 11 has information about the charging state of the battery 14 and the fuel remaining in the tank.

LIST OF REFERENCE SIGNS

1 Gearbox with main rotor
2 Tail rotor
3 Drive shaft
4 Hybrid propulsion system
5 Pilot controller
6 Combustion engine (VM)
7 VM controller
8 Fuel tank
9 Fuel level meter
10 Electric motor (EM)
11 EM controller
12 Power converter
13 Charging unit
14 Battery
15 Charge state indicator
16 Calculation unit
17 Torque sensor
18 Tachometer
19 Data signal line
20 Data memory with value of optimum VM speed
I First phase, climbing
II Second phase, level flight
III Third phase, descent
t Time
H Current altitude
$H_1$ Target altitude
P Power (redundantly for torque)
$P_H$ Total power
$P_{EM}$ Output at the EM
$P_{VM}$ Output at the VM
DZ Speed at the drive shaft, measured
$DZ_0$ Optimum speed
DM Torque at the drive shaft, measured
$DM_0$ Target torque

The invention claimed is:

1. A hybrid propulsion system with controllers and a drive shaft of a helicopter, with a main rotor which is connected to a gearbox and is able to keep a flight attitude set by a pilot stable, comprising:
   a pilot controller,
   a combustion engine (VM) and an electric motor (EM), both of which act directly on the drive shaft,
   wherein the VM is connected to a VM controller which is able to adjust a supply of fuel from a fuel tank to the VM in order to provide a desired propulsive power at the drive shaft;
   and wherein the EM is connected to an EM controller, which is able to operate the EM by discharging a battery or charge the battery by an application of a mechanical power on the EM, whereby the drive shaft would be either accelerated or decelerated respectively,
   wherein one or more torque sensors and tachometers are each arranged on the drive shaft, and both the VM controller and the EM controller are able to maintain values for both a current speed and a current torque during operation,
   wherein specified values for the speed and the torque, in which the VM is able to attain its optimum efficiency, are stored in memory and are retrievable by the EM controller, a first value also being retrievable by the VM controller,
   and that the VM controller is able to reach a preset speed at the drive shaft at any time and maintain it by adapting an output of the VM in order to keep any flight attitude set by the pilot controller stable, wherein the EM controller is additionally able to accelerate or decelerate the drive shaft by engaging the EM, whereby the VM controller is able to adapt the output at the VM automatically based on the current speed in order to reach or maintain a preset speed at the drive shaft, and wherein a first directive is stored in the EM controller to continuously exert an accelerating or braking force of such kind from the EM on the drive shaft, thereby causing the VM, when it has reached or maintains the optimal speed at the drive shaft, to automatically generate the torque at the drive shaft, at which it attains an optimum engine output.

2. The hybrid propulsion system according to claim 1, wherein the EM is arranged between the VM and the gearbox of the main rotor.

3. The hybrid propulsion system according to claim 1, wherein a direct data signal line is set up between the pilot controller and the VM controller for take-off and landing of the helicopter.

4. The hybrid propulsion system according to claim 1, wherein a fuel level meter is also arranged on the fuel tank and a charge state indicator is arranged on the battery, and both are able to transmit their measurement data while the EM controller is in operation.

5. The hybrid propulsion system according to claim 4, wherein a calculation unit for calculating energies that are still available and if necessary for calculating a second directive which differs from the first directive for protecting the battery from overcharging and undercharging, economising on fuel and/or temporarily operating the VM at lower power to reduce emissions.

6. A method for operating a hybrid propulsion system for a drive shaft of a helicopter for guaranteeing a flight attitude set by the pilot using a hybrid propulsion system with controllers according to claim 1 wherein current speed and torque values at the drive shaft are measured continuously and transmitted to both the EM controller and the VM controller, specified values for speed and torque are stored in memory, wherein both values can be retrieved by the EM controller and at least the speed can be retrieved by the VM controller, wherein said controllers continuously calculate deviations of the measured values from the preset values, as soon as a pilot generates a changeable request for power at the drive shaft via the pilot controller to reach a desired flight attitude, a change in the speed at the drive shaft is also caused, the VM controller changes the output at the VM on the basis of a deviation between the current speed and the preset speed slowly in such a way that the preset speed is attained, the EM controller changes the output at the EM in accordance with its first directive in response to a difference between the current values for speed and/or torque and the corresponding preset values more quickly than the VM, in such manner that the VM, when it has adjusted its output to the preset speed with a time lag, exerts the preset torque in which it attains optimal efficiency, whereby either the battery is charged by the mechanical power at the EM or the EM is operated by the charge in the battery, and when the EM controller is deactivated, the VM controller automatically provides requisite propulsive power via VM based on the adjustment of the speed to the preset value and thus guarantees a stable flight attitude.

7. The method according to claim 6, wherein during operation the EM controller increases the output at the EM if a current speed is less than a preset speed and/or a current torque is higher than a preset torque, and vice versa.

8. The method according to claim 6, wherein during a take-off and landing phases only the EM is operated, in order to reduce noise and exhaust emissions in a landing area.

9. The method according to claim 6, using a hybrid propulsion system wherein the EM controller determines an amount of energy still available on the basis of a measurement data from a fuel level meter of the fuel tank and/or a charge state indicator of the battery, and consequently, behaves according to a second directive which differs from an instruction of the first directive, in order to selectively charge or discharge the battery, to protect the battery, to save fuel or to temporarily operate the VM at lower power, in order to reduce emissions.

10. The method according to claim 9, wherein during operation the EM controller increases the output at the EM if a current speed is less than a preset speed and/or current torque is higher than a preset torque, and vice versa.

11. The method according to claim 9, wherein during a take-off and landing phases only the EM is operated, in order to reduce noise and exhaust emissions in a landing area.

12. The method according to claim 8, wherein during operation the EM controller increases the output at the EM if a current speed is less than a preset speed and/or current torque is higher than a preset torque, and vice versa.

\* \* \* \* \*